US012000352B2

(12) United States Patent
Chiba et al.

(10) Patent No.: US 12,000,352 B2
(45) Date of Patent: Jun. 4, 2024

(54) CHARGE FORMING DEVICE WITH PRESSURE SENSOR

(71) Applicant: Walbro LLC, Cass City, MI (US)

(72) Inventors: Tatsuya Chiba, Sendai (JP); Katsuaki Hamataka, Sendai (JP); Tomoya Kawada, Sendai (JP); Naoya Kumagai, Iwanuma (JP); Yuki Tanaka, Natori (JP); Kazunori Tsubakino, Iwanuma (JP); Makoto Waku, Tomiya (JP)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 18/035,670

(22) PCT Filed: Jan. 18, 2022

(86) PCT No.: PCT/US2022/012720

§ 371 (c)(1),
(2) Date: May 5, 2023

(87) PCT Pub. No.: WO2022/159366

PCT Pub. Date: Jul. 28, 2022

(65) Prior Publication Data

US 2023/0407799 A1 Dec. 21, 2023

Related U.S. Application Data

(60) Provisional application No. 63/138,864, filed on Jan. 19, 2021.

(51) Int. Cl.

*F02D 9/02* (2006.01)
*F02D 9/10* (2006.01)
*F02M 7/12* (2006.01)

(52) U.S. Cl.

CPC ................. *F02D 9/02* (2013.01); *F02D 9/10* (2013.01); *F02M 7/12* (2013.01); *F02D 2009/0201* (2013.01)

(58) Field of Classification Search

CPC . F02D 9/02; F02D 9/10; F02D 9/1035; F02D 9/105; F02D 2009/0201; F02D 2200/0406; F02M 7/12; F02M 19/00

See application file for complete search history.

(56) References Cited

U.S. PATENT DOCUMENTS 5,918,584 A * 7/1999 Kato ..................... F02B 61/045 123/681
6,019,078 A * 2/2000 Kimura ................ F02M 35/167 123/184.21

(Continued)

FOREIGN PATENT DOCUMENTS

JP H08277733 A 10/1996
KR 200353005 Y1 6/2004

OTHER PUBLICATIONS

International Preliminary Report on Patentability for PCT/US2022/012720 dated Aug. 3, 2023, 7 pages.

(Continued)

*Primary Examiner* — Grant Moubry
(74) *Attorney, Agent, or Firm* — Reising Ethington P.C.

(57) ABSTRACT

In at least some implementations, a charge forming device includes a main body having a throttle bore, a throttle valve, a housing and a circuit board including a throttle position sensor and a pressure sensor. The throttle valve is received at least partially within the valve bore, is rotatable between an idle position and a second position, and includes a magnet that is rotated when the throttle valve rotates. The housing is carried by the main body, and the circuit board is carried by the housing. A signal path is defined leading from the pressure sensor to a pressure source, the signal path includes a liquid collection area located below a gaseous area with respect to gravity.

19 Claims, 2 Drawing Sheets

(56) References Cited

U.S. PATENT DOCUMENTS

| | | | | |
|---|---|---|---|---|
| 6,055,959 | A * | 5/2000 | Taue | F02M 26/37 123/317 |
| 8,005,603 | B2 | 8/2011 | Fisher et al. | |
| 8,382,072 | B1 * | 2/2013 | Galka | F02M 7/20 261/DIG. 74 |
| 9,062,630 | B2 | 6/2015 | Kus | |
| 2009/0007883 | A1 | 1/2009 | Kazuhiro et al. | |
| 2015/0346733 | A1 | 12/2015 | Yates et al. | |
| 2016/0305348 | A1 * | 10/2016 | Gangler | F02D 11/06 |
| 2019/0120193 | A1 | 4/2019 | Burns et al. | |

OTHER PUBLICATIONS

Written Opinion & International Search Report for PCT/US2022/012720 dated Apr. 20, 2022, 10 pages.

* cited by examiner

CHARGE FORMING DEVICE WITH PRESSURE SENSOR

REFERENCE TO RELATED APPLICATIONS

This application claims the benefit of U.S. Provisional Application Ser. No. 63/138,864 filed on Jan. 19, 2021 the entire content of which is incorporated herein by reference in its entirety.

TECHNICAL FIELD

The present disclosure relates generally to a charge forming device that includes a pressure sensor and a signal path leading to the pressure sensor.

BACKGROUND

Some engines include a device that supplies a fuel and air mixture to the engine for combustion within the engine. Operation of the engine at different altitudes can affect engine operation, as can a dirty air filter which can restrict air flow into and through the device. If the engine is used with a pressure sensor, the pressure sensor is mounted separate from the device. Further, the device may include a throttle valve and determination of the rotary position of the throttle valve can assist in operation of the device and engine.

SUMMARY

In at least some implementations, a charge forming device includes a main body having a throttle bore, a throttle valve, a housing and a circuit board including a throttle position sensor and a pressure sensor. The throttle valve is received at least partially within the valve bore, is rotatable between an idle position and a second position, and includes a magnet that is rotated when the throttle valve rotates. The housing is carried by the main body, and the circuit board is carried by the housing. A signal path is defined leading from the pressure sensor to a pressure source, the signal path includes a liquid collection area located below a gaseous area with respect to gravity.

In at least some implementations, the housing includes a signal passage that defines part of the signal path, and the housing includes a wall that separates the liquid collection area from a portion of the signal path that is connected to the pressure sensor. The wall, in at least some implementations, is annular and the wall is located in a cavity defined at least in part by the housing, and wherein the signal passage opens into the cavity at a location radially spaced from the wall, relative to an axis of the throttle valve shaft. A portion of the signal path closest to the pressure sensor, in at least some implementations, is located radially inwardly of the wall.

In at least some implementations, a first area is defined on one side of the wall with the magnet received in the first area, and the wall defines a second area on a side of the wall opposite to the first area, and wherein the second area includes the liquid collection area below the top of the wall, relative to gravity, and wherein the signal path extends from the first area to the second area over the wall and over the liquid collection area. In at least some implementations, the housing includes a first body and a second body with the first body received between the main body and the second body, and a cavity is defined at least in part by both the first body and the second body, and wherein the wall extends axially into the cavity. In at least some implementations, the circuit board is carried by the second body and wherein part of the signal path is defined by a hole in a dividing wall of the second body, wherein the hole communicates with the first area and is radially spaced from the liquid collection area. In at least some implementations, a signal passage is formed through the first body, the signal passage opens into the second area and defines part of the signal path.

In at least some implementations, the main body includes a passage open to the throttle bore and defining part of the signal path. The passage of the main body, in at least some implementations, opens into the throttle bore between the throttle valve and an outlet of the throttle bore from which a fuel and air mixture is discharged from the main body.

In at least some implementations, the pressure source is atmospheric pressure. In at least some implementations, the signal path is arranged to communicate with an engine manifold that is the pressure source.

In at least some implementations, the throttle position sensor and pressure sensor are coupled together for digital communication via a common wire.

In at least some implementations, the throttle position sensor is centered relative to an axis of the throttle valve.

In at least some implementations, the pressure sensor is lower than the liquid collection area, relative to gravity and relative to the normal orientation of the device in use. A portion of the signal path, in at least some implementations, is open directly to the liquid collection area and extends over the liquid collection area.

In at least some implementations, a charge forming device includes a main body having a throttle bore and a main body passage open to the throttle bore and extending through the main body, a throttle valve received at least partially within the valve bore, the throttle valve being rotatable between an idle position and a second position, and the throttle valve including a magnet that is rotated when the throttle valve rotates, a housing carried by the main body, the housing including a cavity in which a portion of the throttle valve including the magnet is received, and the housing including a signal passage communicating at with the main body passage and with the cavity, and a circuit board carried by the housing. The circuit board including a throttle position sensor and a pressure sensor, and wherein a signal path is defined leading from the pressure sensor to a pressure source, the signal path includes the main body passage, the signal passage and a liquid collection area located below a gaseous area with respect to gravity.

In at least some implementations, the housing includes a wall within the cavity, a first area is defined on one side of the wall with the magnet received in the first area, and the wall defines a second area on a side of the wall opposite to the first area, and wherein the second area includes the liquid collection area below a top of the wall, relative to gravity, and wherein the signal path extends from the first area to the second area over the wall and over the liquid collection area. In at least some implementations, the housing includes a first body and a second body with the first body received between the main body and the second body, and the cavity is defined at least in part by both the first body and the second body, and wherein the wall extends axially into the cavity.

BRIEF DESCRIPTION OF THE DRAWINGS

The following detailed description of certain embodiments and best mode will be set forth with reference to the accompanying drawings, in which.

DETAILED DESCRIPTION

Figure 1:
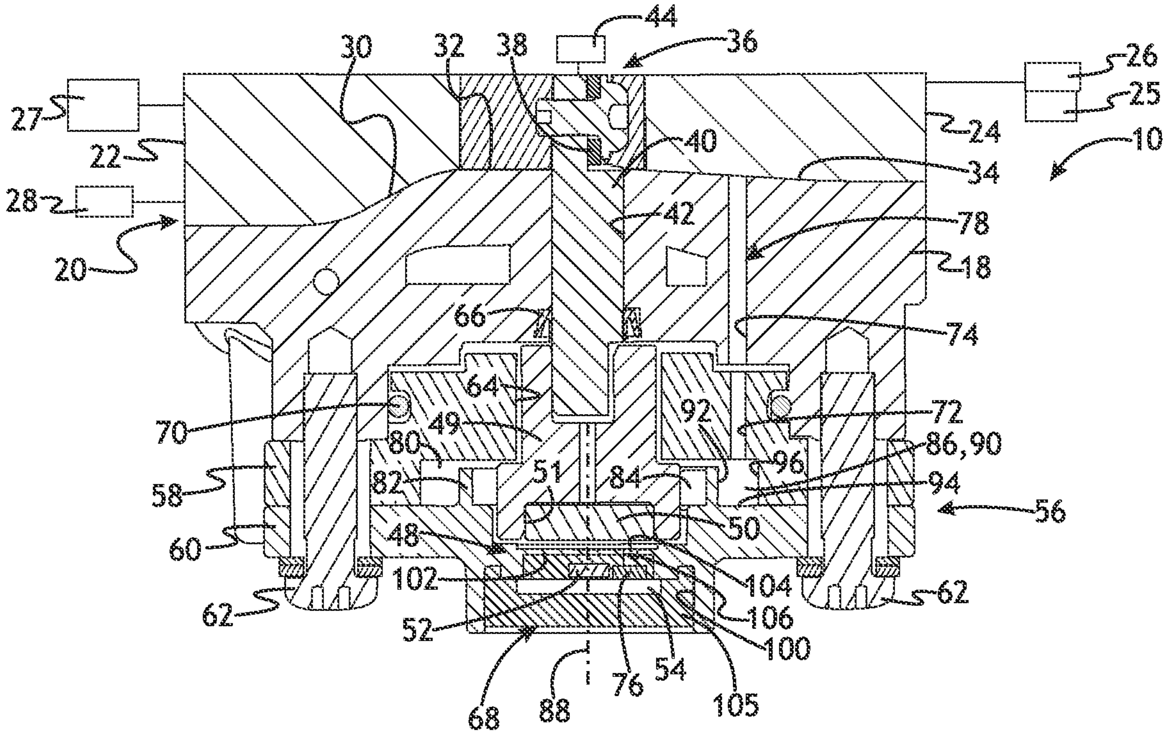
FIG. 1 is a fragmentary sectional view of a charge forming device including a pressure sensor and a signal path for communication with a pressure sensor.

Referring in more detail to the drawings, FIG. 1 illustrates a charge forming apparatus 10 that provides a combustible fuel and air mixture to an internal combustion engine to support operation of the engine. The charge forming apparatus 10 may be, for example, a throttle body or a carburetor, such as a diaphragm or float bowl carburetor.

The assembly 10 includes a main body 18 that has a throttle bore 20 with an inlet 22 through which air is received into the throttle bore 20 and an outlet 24 connected or otherwise communicated with the engine 25 (e.g. an intake manifold 26 thereof). The inlet 22 may receive air from an air filter 27, if desired, and that air may be mixed with fuel provided from a fuel metering valve 28 or fuel injector, such as is disclosed in U.S. Publication No. 2019/0120193, or from a carburetor fuel flow path, such as is disclosed in U.S. Pat. No. 9,062,630. These patents are representative and the disclosures of these patents are incorporated herein by reference in their entireties.

The throttle bore 20 may have any desired shape including (but not limited to) a constant diameter cylinder or a venturi shape wherein the inlet 22 leads to a tapered converging portion 30 that leads to a reduced diameter throat 32 that in turn leads to a tapered diverging portion 34 that leads to the outlet 24. The converging portion 30 may increase the velocity of air flowing into the throat 32 and create or increase a pressure drop in the area of the throat 32.

Figure 2:
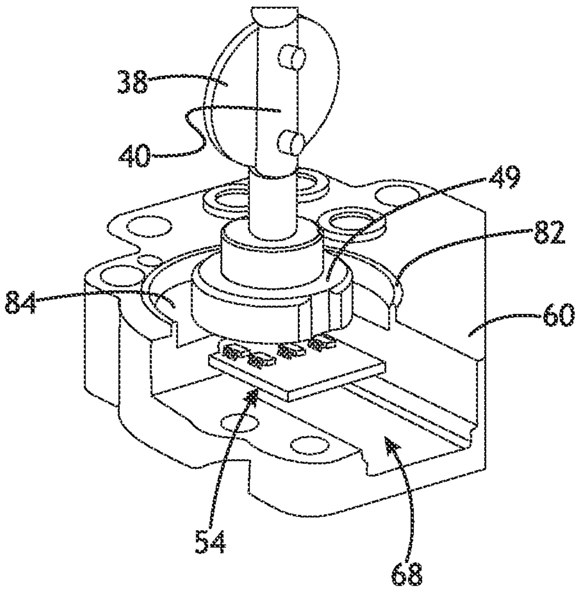
FIG. 2 is a fragmentary perspective view showing part of a housing and part of a throttle valve.

Referring to FIGS. 1 and 2, the air flow rate through the throttle bore 20 and into the engine is controlled by a throttle valve 36. In at least some implementations, the throttle valve 36 includes a head 38 which may include a flat plate disposed in the throttle bore 20 and coupled to a rotating throttle valve shaft 40. The shaft 40 extends through a shaft bore 42 that intersects and may be generally perpendicular to the throttle bore 20. The throttle valve 36 may be driven or moved by an actuator 44 between an idle position wherein the head 38 substantially blocks air flow through the throttle bore 20 and a fully or wide open position wherein the head 38 provides less of a restriction (and may provide the least restriction of any position of the valve 36) to air flow through the throttle bore 20. In one example, the actuator 44 may be an electrically driven motor coupled to the throttle valve shaft 40 to rotate the shaft and thus rotate the valve head within the throttle bore 20. In another example, the actuator 44 may include a mechanical linkage, such as a lever attached to the throttle valve shaft 40 to which a Bowden wire may be connected to manually rotate the shaft 40 as desired.

Figure 3:
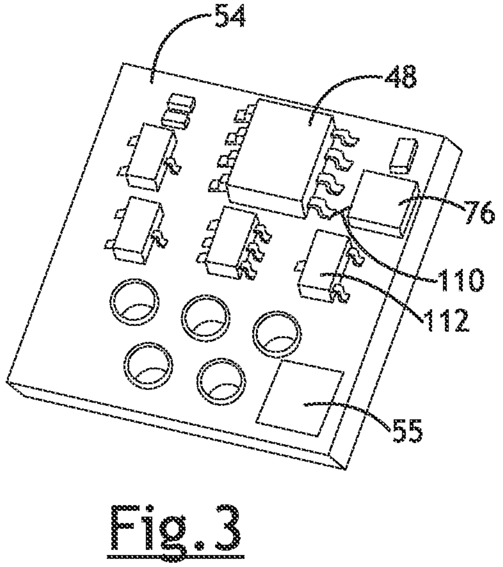
FIG. 3 is a perspective view of a circuit board including a throttle position sensor and the pressure sensor.

In the example shown in FIGS. 1 and 3, a throttle valve position sensor 48 is provided so that the instantaneous rotary position of the throttle valve 36 can be determined. The throttle valve position sensor 48 may include a magnet 50 carried by the throttle valve shaft 40 and a magnetically responsive sensor 52 carried by a circuit board 54. The magnet 50 may be received in a carrier 49 that is fixed to the throttle valve shaft 40 for rotation with the throttle valve shaft 40. The carrier 49 may include a pocket 51 or other feature adapted to receive and securely retain the magnet 50 so that the magnet 50 moves relative to the sensor 52 as the throttle valve shaft 40 rotates. The circuit board 54, sensor 52 and an end of the throttle valve shaft 40 on which the magnet carrier 49 and magnet 50 are received in and may be covered by a housing 56 coupled to the throttle body 18. The throttle position sensor 48 may be of any suitable type, and while shown as a non-contact, magnetic sensor, it could be a contact based sensor (e.g. variable resistance or potentiometer). The circuit board 54 may include a controller or processor 55 (diagrammatically shown in FIG. 3) used to determine throttle valve position (e.g. idle, fully or wide open or any position or degree of opening between idle and wide open), or it may communicate the output of the sensor 52 with a remotely located controller. Further, where the circuit board 54 includes a controller 55, the same controller may also be used to control one or more of an actuator 44 for the throttle valve 36 and a valve (or valves) that controls fuel or air flow.

In the example shown, the throttle position sensor 48 is at one end of the throttle valve shaft 40 and the throttle valve actuator 44 (e.g. a motor or valve lever) is at the other end. In such an arrangement, both ends of the throttle valve shaft 40 may be accessible from the exterior of the throttle body 18, and may have components mounted thereto such that a retainer for the throttle valve shaft 40 is positioned between the ends of the shaft.

The housing 56 includes a first body 58 and a second body 60 coupled to the first body 58, with the first body 58 received between the second body 60 and the main body 18. Fasteners 62 may extend through aligned openings in the first body 58, second body 60 and the main body 18, and the openings in the main body 18 may be threaded to facilitate connection of the housing 56 to the main body 18. The first body 58 includes an opening 64 and one or both of the throttle valve shaft 40 and the magnet carrier 49 extends through the opening 64. One or both of the first body 58 and main body 18 may carry a seal 66 that is provided surrounding the throttle valve shaft 40, to inhibit or prevent liquid from leaking through the opening 64 and to a circuit board area 68 of the housing 56. A seal 70 may also be provided between an outer surface of the first body 58 and the main body 18. This seal 70 may be outboard of a signal passage 72 through the first body 58 that communicates with a passage 74 in the main body 18 that, in at least some implementations, is open to the throttle bore 20. Liquid that may enter the passage 74 (e.g. from the throttle bore 20) is prevented from leaking out between the main body 18 and first body 58 by this seal 70.

The signal passage 72 in the first body 58 is communicated with the area 68 in which the circuit board 54 is located such that a pressure in the throttle bore 20 is communicated with a pressure sensor 76 located on the circuit board 54. The pressure signal may be routed to the pressure sensor 76 in other ways. In at least some implementations, at least one of the first body 58 and second body 60 include a passage (e.g. signal passage 72) that defines part of a signal path 78 from a desired area to the pressure sensor 76. In the example shown, the signal path 78 extends between the throttle bore 20 and the pressure sensor 76, although the pressure signal may be provided from a different area, such as the intake manifold 26, as desired. In at least some implementations, the signal path 78 is open to an area of the throttle bore 20 that is downstream of the throttle valve shaft 40, and which may, in at least some implementations, be in the area in which liquid fuel enters the throttle bore 20. The inlet port or end of the passage 74 in the main body 18 may be spaced from where liquid fuel enters the throttle bore 20 or otherwise covered relative to liquid fuel to inhibit liquid fuel from entering the passage 74.

In use, fuel vapor may condense in or liquid fuel may otherwise enter the passage 74 in some circumstances. To inhibit liquid flow to the pressure sensor 76, or liquid from unduly interfering with the pressure signal provided to the pressure sensor 76, the signal path 78 may be tortuous (e.g. a labyrinth) and include portions that may collect liquids apart from a gaseous flow path. In at least some implementations, part of the signal path 78 is defined by an area having greater volume than a predetermined volume of liquid, leaving an area open above liquid in the area, so that gaseous matter located above the collected liquid still is communicated with the pressure sensor 76 (where above means above the liquid with respect to the direction of gravity). In the examples shown, a cavity 80 is defined between the first body 58 and second body 60 and a wall 82 is provided in the cavity 80. A first area 84 is on one side of the wall 82 and is open to the circuit board area 68 in which the pressure sensor 76 is located, and a second area 86 is on the other side of the wall 82 and is open to the pressure signal passage 72. Relative to the throttle valve shaft axis 88, the pressure signal passage 72 opens to the cavity 80 at a location radially spaced from the wall 82 and on the opposite side of the wall from the first area 84.

In the example shown, the wall 82 is annular, and an annular space 90 is defined between the outer surface 92 of the wall 82, a lower surface 94 of the cavity 80 and an exterior surface 96 of the cavity 80 that is radially outwardly spaced from the wall 82 and extends upwardly from the lower surface 94. The signal passage 72 in the first body 58 opens into the second area 86 (e.g. annular space 90), and the signal path to the pressure sensor 76 has a portion that extends from the second area 86, over the wall 82, and radially inwardly of the wall 82 to the first area 84. Thus, the end of the signal passage 72 in the first body 58, and the liquid that flows out of it, is aligned with or oriented into the space 90 defined radially outboard of the wall 82, which defines a liquid collection area, and does not prevent gaseous communication with the pressure sensor 76 via a path over the wall 82 and over any liquid in the space 90. Thus, the wall 82 defines a divider that provides a collection area below the top of the wall 82 (relative to gravity) and below a gaseous path or area that extends over the top of the wall.

In at least some implementations, the second body 60 includes a cavity 100 aligned with the throttle valve shaft 40 such that the magnet 50 is arranged over (axially aligned with) at least part of the cavity 100. The circuit board 54 may be received in the cavity 100 and the throttle position sensor 48 may be oriented in a desired manner relative to the magnet 50, to detect movement of the magnet 50 as the throttle valve 36 rotates. The pressure sensor 76 may be located on the circuit board 54, and part of the signal path 78 extends to the pressure sensor 76. In the example shown, the second body 60 includes a dividing wall 102 that separates the cavity 100 in which the circuit board 54 is located from the cavity 80 in which the magnet 50 and magnet carrier 49 are located. A hole 104 or passage through the dividing wall 102 communicates with the pressure sensor 76 and defines part of the signal path 78. The hole 104 may communicate with a portion of the signal path 78 that is defined between the magnet carrier 49 and the second body 60, within the cavity 80. In the example shown, the circuit board cavity 100 is filled with an epoxy or other potting material 105 to protect the circuit board components from liquids, and a passage 106 through the potting material is aligned with the hole 104 through the dividing wall 102 and leads to the pressure sensor 76, and thus also defines part of the signal path 78. The hole 104 and the passage 106 through the potting material 105 define a portion of the signal path 78 closest to the pressure sensor 76, and this portion of the signal path 78 is located radially inwardly of the wall 82. Liquid that enters that portion of the signal path 78 is limited in exposure to the pressure sensor 76 by the potting material 105 which protects the remaining circuit board components from such liquid and from contaminants from the exterior of the charge forming device 10 (e.g. outboard of the second body 60).

Thus, the signal path 78 includes a liquid collection area (e.g. space 90) located below the top of a retaining surface or wall 82, where below is relative to gravity and considering the normal orientation of the charge forming device 10 in operation. The normal orientation of the illustrated example is shown in FIG. 1. Further, the liquid collection area 90 is radially or laterally offset, in a direction perpendicular from the direction of gravity, from the pressure sensor 76 and the portion of the signal path 78 that leads directly to the pressure sensor 76 (e.g. the portion formed in the dividing wall 102 and/or potting material 105). Accordingly, liquid does not readily flow through the signal path 78 to the pressure sensor 76 and would instead have to fill or overflow the annular space 90 before entering a portion of the signal path 78 that leads to the pressure sensor 76.

While shown as being defined by passages (e.g. 72, 74, 102, 106) and cavities (e.g. 80) defined internally of the main body 18, first body 58 and/or second body 60, the signal path 78 could instead be defined at least in part by or include one or more external tubes. The signal path 78 may communicate with a source of atmospheric pressure, outside of the throttle bore 20, if desired. Further, while the first and second body 60 are shown in the illustrated example, the features described herein with regard to the signal path 78 and circuit board 54 could be provided in one body. Still further, while the signal path 78 in the illustrated example is shown as being defined in part between the magnet carrier 49 and either the first body 58 or second body 60, the signal path 78 could be separate from and not defined in part by the magnet carrier.

In at least some implementations, the throttle position sensor 48 is coaxial with the throttle valve shaft 40. That is, the throttle valve shaft axis 88, extends through a center of the throttle position sensor 48. The pressure sensor 76 may be adjacent to the throttle position sensor 48, and the two sensors may be coupled together for digital communication via a common wire 110, or otherwise share wiring with the signal from each sensor 48, 76 provided via any desired digital communication, such as 12C or the like. In addition to providing a pressure signal that may be used to control throttle valve position and/or air or fuel flow, the pressure sensor 76 can detect clogging of the air filter when a pressure signal different than predicted is provided by the pressure sensor 76.

Other sensors may also be provided on the circuit board 54, for example, a temperature sensor 112. The temperature sensor 112 may facilitate a determination of air density and enables the controller 55 to provide corrections for different air densities to ensure a desired engine operation across a wider range of conditions.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A charge forming device, comprising:

a main body having a throttle bore;

a throttle valve received at least partially within the valve bore, the throttle valve being rotatable between an idle position and a second position, and the throttle valve including a magnet that is rotated when the throttle valve rotates;

a housing carried by the main body; and a circuit board carried by the housing, the circuit board including a throttle position sensor responsive to movement of the magnet, and the circuit board includes a pressure sensor, and wherein a signal path is defined leading from the pressure sensor to a pressure source, the signal path includes a liquid collection area located below a gaseous area with respect to gravity.

2. The device of claim 1 wherein the housing includes a signal passage that defines part of the signal path, and the housing includes a wall that separates the liquid collection area from a portion of the signal path that is connected to the pressure sensor.

3. The device of claim 2 wherein the wall is annular and the wall is located in a cavity defined at least in part by the housing, and wherein the signal passage opens into the cavity at a location radially spaced from the wall, relative to an axis of the throttle valve shaft.

4. The device of claim 2 wherein a portion of the signal path closest to the pressure sensor is located radially inwardly of the wall.

5. The device of claim 4 wherein a first area is defined on one side of the wall with the magnet received in the first area, and the wall defines a second area on a side of the wall opposite to the first area, and wherein the second area includes the liquid collection area below the top of the wall, relative to gravity, and wherein the signal path extends from the first area to the second area over the wall and over the liquid collection area.

6. The device of claim 5 wherein the housing includes a first body and a second body with the first body received between the main body and the second body, and a cavity is defined at least in part by both the first body and the second body, and wherein the wall extends axially into the cavity.

7. The device of claim 6 wherein the circuit board is carried by the second body and wherein part of the signal path is defined by a hole in a dividing wall of the second body, wherein the hole communicates with the first area and is radially spaced from the liquid collection area.

8. The device of claim 6 wherein a signal passage is formed through the first body, the signal passage opens into the second area and defines part of the signal path.

9. The device of claim 1 wherein the main body includes a passage open to the throttle bore and defining part of the signal path.

10. The device of claim 9 wherein the passage of the main body opens into the throttle bore between the throttle valve and an outlet of the throttle bore from which a fuel and air mixture is discharged from the main body.

11. The device of claim 1 wherein the pressure source is atmospheric pressure.

12. The device of claim 1 wherein the signal path is arranged to communicate with an engine manifold that is the pressure source.

13. The device of claim 1 wherein the throttle position sensor and pressure sensor are coupled together for digital communication via a common wire.

14. The device of claim 1 wherein the throttle position sensor is centered relative to an axis of the throttle valve.

15. The device of claim 1 wherein the pressure sensor is lower than the liquid collection area, relative to gravity and relative to the normal orientation of the device in use.

16. The device of claim 15 wherein a portion of the signal path is open directly to the liquid collection area and extends over the liquid collection area.

17. A charge forming device, comprising:

a main body having a throttle bore and a main body passage open to the throttle bore and extending through the main body;

a throttle valve received at least partially within the valve bore, the throttle valve being rotatable between an idle position and a second position, and the throttle valve including a magnet that is rotated when the throttle valve rotates;

a housing carried by the main body, the housing including a cavity in which a portion of the throttle valve including the magnet is received, and the housing including a signal passage communicating at with the main body passage and with the cavity; and a circuit board carried by the housing, the circuit board including a throttle position sensor and a pressure sensor, and wherein a signal path is defined leading from the pressure sensor to a pressure source, the signal path includes the main body passage, the signal passage and a liquid collection area located below a gaseous area with respect to gravity.

18. The device of claim 17 wherein the housing includes a wall within the cavity, a first area is defined on one side of the wall with the magnet received in the first area, and the wall defines a second area on a side of the wall opposite to the first area, and wherein the second area includes the liquid collection area below a top of the wall, relative to gravity, and wherein the signal path extends from the first area to the second area over the wall and over the liquid collection area.

19. The device of claim 18 wherein the housing includes a first body and a second body with the first body received between the main body and the second body, and the cavity is defined at least in part by both the first body and the second body, and wherein the wall extends axially into the cavity.

* * * * *